(12) United States Patent
Zhang et al.

(10) Patent No.: US 9,713,082 B2
(45) Date of Patent: Jul. 18, 2017

(54) SERVICE NODE SELECTION IN A COMMUNICATIONS NETWORK BASED ON APPLICATION SERVER INFORMATION

(71) Applicant: Telefonaktiebolaget L M Ericsson (publ), Stockholm (SE)

(72) Inventors: Shunliang Zhang, Beijing (CN); Xuejun Cai, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/440,105

(22) PCT Filed: Nov. 13, 2012

(86) PCT No.: PCT/CN2012/084510
§ 371 (c)(1),
(2) Date: May 1, 2015

(87) PCT Pub. No.: WO2014/075211
PCT Pub. Date: May 22, 2014

(65) Prior Publication Data
US 2015/0289203 A1 Oct. 8, 2015

(51) Int. Cl.
*H04W 36/00* (2009.01)
*H04W 48/20* (2009.01)
(Continued)

(52) U.S. Cl.
CPC ......... *H04W 48/20* (2013.01); *H04L 12/1407* (2013.01); *H04L 67/2842* (2013.01);
(Continued)

(58) Field of Classification Search
CPC .................. H04W 4/02; H04M 2215/46
(Continued)

(56) References Cited

U.S. PATENT DOCUMENTS

| 2012/0281621 | A1 | 11/2012 | Lotfallah et al. |
| 2012/0322497 | A1* | 12/2012 | Navda ............... H04W 36/0083 455/525 |
| 2013/0029708 | A1* | 1/2013 | Fox ....................... H04W 28/08 455/509 |
| 2013/0100819 | A1* | 4/2013 | Anchan ................. H04W 48/20 370/241 |

(Continued)

FOREIGN PATENT DOCUMENTS

CN 102316091 A 1/2012

OTHER PUBLICATIONS

Alimi, E., et al., "ALTO Protocol", ALTO WG Internet-Draft, Standards Track, Oct. 31, 2011, pp. 1-76, IETF.
Alimi, E., et al., "ALTO Protocol", ALTO WG Internet-Draft, Standards Track, Sep. 7, 2012, pp. 1-76, IETF.
Penno, R., et al., "Alto and Content Delivery Networks", Network Working Group Internet-Draft, Mar. 14, 2011, pp. 1-19, IETF.

*Primary Examiner* — Kiet Doan
(74) *Attorney, Agent, or Firm* — Coats & Bennett, P.L.L.C.

(57) ABSTRACT

The invention refers to providing a service associated to a service request (S1) received from a mobile user equipment—UE—(10), the communications network comprising a plurality of service nodes (21a-21h), a service control node (23) and an application server (24), wherein the service control node (23), in response to the service request, sends a request (S4) to the application server (24) to get selection assistance information with respect to the UE, receives a response (S11) from the application server (24) comprising selection assistance information, and selects or initiates selecting a service node (21) from the plurality of service nodes (21a-21h) in dependency of the selection assistance information. The invention further refers to a control node, an application server and to corresponding programs.

22 Claims, 4 Drawing Sheets

(51) Int. Cl.
*H04W 8/10* (2009.01)
*H04L 29/08* (2006.01)
*H04L 12/14* (2006.01)
*H04W 36/14* (2009.01)
*H04W 36/24* (2009.01)
*H04W 48/18* (2009.01)
*H04W 64/00* (2009.01)
*H04W 4/02* (2009.01)

(52) U.S. Cl.
CPC ............ *H04W 4/025* (2013.01); *H04W 8/10* (2013.01); *H04W 36/14* (2013.01); *H04W 36/245* (2013.01); *H04W 48/18* (2013.01); *H04W 64/006* (2013.01); *H04L 67/1002* (2013.01); *H04W 4/02* (2013.01); *H04W 4/027* (2013.01); *H04W 64/00* (2013.01)

(58) Field of Classification Search
USPC ......... 455/456.3, 456.1, 515, 525, 509, 445, 455/436, 411, 435.2; 370/331, 241, 312, 370/232, 252, 392, 335, 522, 352, 329, 370/332
See application file for complete search history.

(56) References Cited

U.S. PATENT DOCUMENTS

2013/0102356 A1* 4/2013 Shaw .................... H04W 48/20
455/525
2014/0215079 A1 7/2014 Penno et al.

\* cited by examiner

SERVICE NODE SELECTION IN A COMMUNICATIONS NETWORK BASED ON APPLICATION SERVER INFORMATION

TECHNICAL FIELD

The present invention relates service node selection supported by a mobile network and especially refers to a server selection in a Content Distribution Network—CDN—.

BACKGROUND

Recently, due to the quick growth of smart phone penetration, data traffic on mobile network is experiencing significant growth. At the same time, more affordable service and application are expected by end users. Therefore, many operators are facing the challenge to offload their overloaded networks and reduce the transport and peering cost. Facing this situation, so-called Content Distribution Networks have been proposed attracting more and more attention. When introducing Content Distribution Network or Content Delivery Network—CDN—system into mobile networks, also being referred to as mobile CDN, there are many potential issues. One important issue is how to select an appropriate CDN server to serve a moving mobile terminal or user equipment—UE—by considering mobile network specific characteristics, such as UE movement.

First of all, in contrast to CDN being realized in fixed networks where the IP address is usually used as location information, in mobile networks, the same IP address is allocated to a UE when roaming under the same P-GW/GGSN, e.g. all UEs under the same P-GW/GGSN get allocated an IP address from the same sub-network. Hence, for mobile UEs, the IP address might not be sufficiently effective to be used as location information to find an appropriate CDN server, also being referred to as CDN distribution or delivery node—CDN DN—, e.g. when some CDN DNs are deployed below Gi (UMTS)/SGi (EPS) interface (in other words, inside of mobile networks). The CDN DN stores copies of the content and delivers content to the client according to instructions from the control logic in a CDN control node, —CDN CN—. The CDN CN generally decides about how to react to a content request, what content is to be delivered and from which CDN DN the content shall be delivered. This node might further control in which CDN DN copies of certain content is stored.

A further issue might to be considered when selecting a CDN DN to serve a moving UE: the closer a CDN DN is to the UE, the better with respect to transport bandwidth saving and latency reduction. On the other hand, there is an increasing risk of CDN DN relocation and service interruption for the moving UE.

In case an CDN server below Gi/SGi is selected, the existing mobility management mechanism of 3GPP networks may not be appropriate to ensure the service continuation for moving terminals like that of SIPTO/LIPA situation.

An introduction of CDN into mobile networks might mean that some CDN DNs are deployed in mobile networks, i.e. below Gi/SGi interface, and some other CDN DNs are deployed above Gi/SGi interface. Generally, above Gi/SGi refers to a CDN DN being deployed outside of the mobile network and below Gi/SGi refers to a CDN DN within or comprised by the mobile network. In case of a CDN DN below Gi/SGi, this CDN DN can be deployed in the radio access network (RAN) or the core network (CN). One issue thereof might be related to security and charging, e.g. the CDN CN selecting an appropriate edge node to serve a specific moving UE. For example, due to security requirements, for a UE, certain media content might not be allowed to be provided by an CDN server below SGi/Gi interface although the gains may be bigger from performance point of view. In addition, due to requirement of lawful interception or charging, for some UEs, a CDN DN located in CN instead of a CDN DN located in RAN is preferred to be used to serve the mobile UE.

One important issue of CDN system is the CDN delivery node (DN) or service node selection. Currently, several typical approaches are proposed such as DNS based, HTTP redirection or URL rewriting. A recent proposal/realization of a server selection proposes a GSLB (global service load balancer function) of a CDN provider selecting the best service node for a UE based on IP address of a local DNS server which is usually associated with the UE IP address, and, and other information such as resource status of service node, link status from UE to service node, etc. The SLB locally selects the specific cache node to serve the UE by various mechanisms such as HTTP redirection, URL rewriting. In other words, the central control system (CDN CN) selects an edge server by GSLB at macro level. The SLB located in the CDN Edge server/node will select locally which Cache will be used to the UE at micro level.

Several local caches may be transparent to out side of the CDN edge server from IP level. Several Caches may share the same public IP address to outside UEs such that only the CDN Edge server/node knows the internal topology of local Cache nodes controlled by it.

However, the above-described mechanism has been developed with a focus to fixed networks rather than to mobile network requirements. In contrast to CDN on fixed networks where IP address can be used as location information, in mobile networks, the same IP address is allocated to a UE when moving under the same P-GW/GGSN, e.g. each UE served by the same P-GW/GGSN is a allocated a IP address. In this situation, the IP address isn't effective to be used as location information to find an appropriate CDN DN node (e.g. the node to serve a UE locally with cached content) when some CDN DN nodes are deployed below Gi/SGi interface. Further, compared with fixed CDN system, the mobility of UE might be an issue to be considered when selecting a CDN DN to serve a moving UE: The closer a CDN DN is to a UE, the more gains are possible with respect to transport bandwidth saving and latency reduction; on the other hand there is an increased risk of a CDN DN relocation and service interruption for the moving UE.

SUMMARY

It is an object of the present invention to improve existing service node selection taking the mobile network specific issues into account.

This object is achieved by the independent claims. Advantageous embodiments are described in the dependent claims.

According to an embodiment, mobile network and/or mobile UE specific information is provided to a content distribution (or delivery) network—CDN—control node (also being referred to as CDN CN in charge of selecting an appropriate CDN distribution node—CDN DN—(also being referred to as CDN service node or edge node) appropriate to serve a mobile UE request with respect to a CDN service. Information relevant or useful for a selection of a CDN distribution node is being provided to the CDN server by support of an (application layer) server that collects such information from suitable network devices and provides this information, e.g. by means of a client server protocol to a client within the CDN server. Such information that is also being referred to as selection assistance information in the following might comprise:

UE information, e.g. UE mobility info (e.g. a handover—HO—record (indicative of a frequency or a number over a time of cell handovers) or a moving speed (that may be derived from a HO record)), location information (e.g. UE location information with respect to the current mobile network, e.g. cell/eNB ID, S/P-GW, RAT being used by the UE), further capability information and/or UE subscription information, and/or mobile network information, e.g. topology information and capability information, core network load status information, related backhaul load status, and/or (mobile operator's) policy information regarding CDN service node selection for the mobile UE.

In an embodiment, the CDN CN is associated to an (application layer) traffic optimization client, communicating with an (application layer) traffic optimization server.

In an embodiment, the client is based on a so-called Application Layer Traffic Optimization—ALTO—client, and server is based on an ALTO server according to the ALTO protocol currently under definition by the IETF. IETF Internet-Draft titled "ALTO protocol, daft-ietf-alto-protocol-13.txt", actually retrievable under http://tools.ietf.org/id/draft-ietf-alto-protocol-13.txt, wherein the ALTO protocol defined in the above-cited IETF draft is enhanced to convey the additional mobile network and/or mobile UE specific info as mentioned above.

The ALTO server in this way can be regarded as a hub for collecting and distributing information as described above in order to enable an improved CDN node selection. On the other hand, with the introduction of an information exchange between the ALTO client associated to the CDN CN and the ALTO server, the CDN CN may get useful/necessary information with regard to CDN DN selection without further communicating with a number of instances, e.g. without communicating with the P-GW.

Some exemplary embodiments with respect to mobile CDN DN selection are provided in the following:

In a case that a selection of CDN DN in a radio access network—RAN—is permitted according to the operators' policy the following decision can be taken according to a speed of the moving UE and/or to an expected life time of a CDN session:

if the UE speed is low (e.g. below a speed threshold) and or the expected life time of a session related to the UE service request is short (e.g. below a session time threshold), a CDN DN close(r) to UE is prioritized/preferred, e.g. an edge node located in RAN.

If the UE speed is high (e.g. above the speed threshold) a high speed moving UE or the expected life time of the session related to the UE service request is long (e.g. above the session time threshold), a CDN DN closer to Gi/SGi (e.g. a CDN DN with the fewest hops (e.g. one hop) away from the P-GW or GGSN) may be prioritized or preferred, e.g. an edge node located in the core network or above Gi/SGi could be prioritized/preferred.

If for certain content access by a specific UE, only a CDN service node above Gi/SGi is permitted according operators' policy, then the CDN DN located in PDN is selected regardless the moving speed of the UE.

In a further embodiment, a User Data Convergence—UDC—client function provided e.g. being associated to the ALTO server to retrieve mobile user related subscription info. By means of a UDC specific interface between the UDC client server a User Data Repository—UDR—, mobile UE subscription information can be provided to ALTO server from HLR/HSS. Thereto, the following information may be exchanged:

UE SIPTO/LIPA subscription,

QoS related subscription info, and or

UE capability information (e.g. multi-access capability, seamless Wi-Fi HO or not)

In a further embodiment, the interface between the OAM system of the mobile network and the ALTO server, mobile network specific load status information can be provided to ALTO server. In detail, following information may be exchanged:

core network—CN—element (e.g. S/P-GW) load status information,

Radio network element (eNB) and/or Radio interface load status information, and/or Related backhaul link load status information.

In an embodiment, an interface between the PCRF and/or P-GW/GGSN and the ALTO server is extended to convey the mobile network operator specific policy information and mobile UE specific information to ALTO server. In detail, following information may be exchanged:

policy information indicating CDN DN selection related policy for a specific user or for a group of users (for example, CDN DN located in RAN, CN ,or PDN can be selected or not) accessing a specific content/service provided by CDN, and/or mobile UE related location information, mobility information (derived from UE mobility history information or reported by UE)

According to the first embodiment, a selection of an appropriate data service node within a communications network is proposed, wherein the communications network comprises a data service network to serve service data or content requests originating from user equipments and a mobile network to assure a communications network connection to mobile users. The data service network comprises a plurality of (data) service nodes (that might have stored or cached data content and/or applications of associated to a service) e.g. locally distributed over the communications network (e.g. covering a certain geographical area), a gateway node for interworking between the PDN and the mobile network (thus terminating the data traffic both with the PDN and the mobile network), In an embodiment, the data network is a so-called CDN network comprising a plurality of CDN service nodes and a central node. The CDN service nodes are also being referred to as CDN cache nodes or edge nodes, and the central node is also being referred to as central CDN server comprising GLSB functions.

The CDN network might be a service network and/or a content distribution networks. A central CDN control node or CDN CN might be logically part of the CDN network although being physically part of the core network, or the mobile network.

In a further embodiment, the gateway node is a packed data gateway, e.g. a so-called Packet Data Network Gateway (P-GW) or Gateway GPRS Support Node (GGSN) and the policy server is a so-called PCRF.

Further embodiments of the invention allow the mobile network operator to influence the edge node selection process for a mobile UE in case the edge node is located in the mobile network.

The present invention also concerns computer programs comprising portions of software codes in order to implement the method as described above when operated by a respective processing unit of a user device and a recipient device. The computer program can be stored on a computer readable medium. The computer-readable medium can be a permanent or rewritable memory e.g. within service node or the information server or located externally. The respective computer program can be also transferred to the servers for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
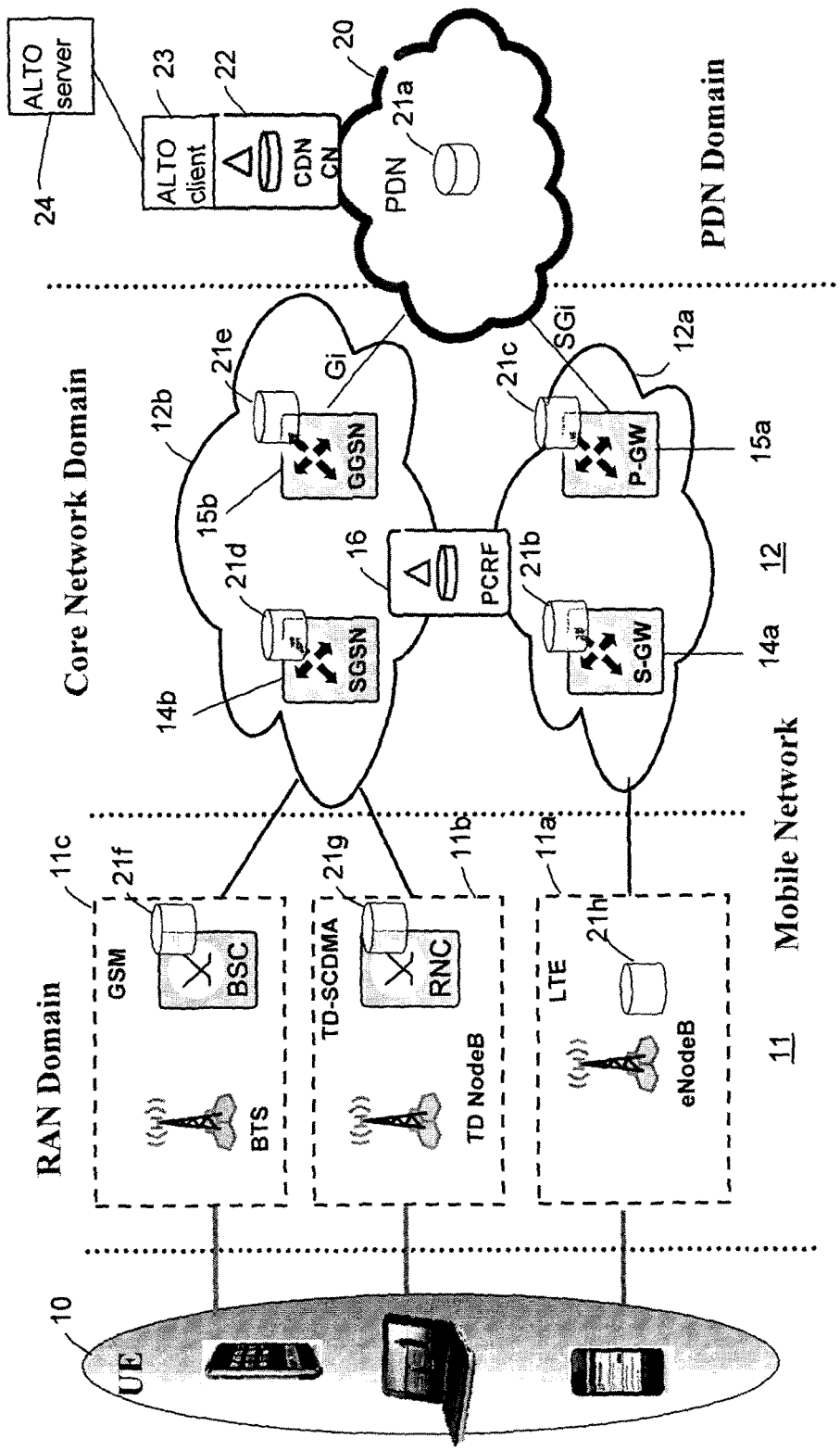
FIG. 1 shows a user terminal and communications network for performing an edge node selection.

FIG. 1 shows a principle block diagram with a communications network and a mobile user equipment 10 being connected to the communications network. The communications network comprises a mobile network and a packed data network—PDN—20.

The mobile network is divided into a radio access network RAN domain 11 and a core network CN domain 12. The RAN domain by way of example comprises a GSM RAN 11c, an UMTS Terrestrial Radio Access Network 11b, also being referred to as UTRAN, and an LTE RAN 11a, also being referred to as evolved UMTS Terrestrial Radio Access Network (eUTRAN).

The core network domain 12 may accordingly comprise a GPRS (General packet radio service) core network 12b and a so-called evolved packet system (EPS) 12a.

The GPRS core network 12b exemplarily shows a so-called Serving GPRS Support Node (SGSN) 14b and a so-called Gateway GPRS Support Node (GGSN) 15b. The SGSN 14b is responsible for the delivery of data packets from and to the UE 10 over the UTRAN 11b. Its tasks might include packet routing and transfer, mobility management (attach/detach and location management), logical link management, and authentication and charging functions. The GGSN 15b is responsible for the interworking between the GPRS network and the external packet switched networks (here the PDN 20), thus terminating the GPRS network (by means of the so-called Gi interface according to 3GPP) to the packet data network 20.

The EPS 12a exemplarily shows a serving gateway S-GW 14a, and a Packet Data Network Gateway P-GW 15a.

The S-GW 14a is a gateway which terminates the mobile network towards the eUTRAN 11a. Amongst other functions, this gateway serves as a local mobility anchor (e.g. with respect to eUTRAN's eNodeB handover).

The EPS 12a may further comprise a mobility management entity—MME—(not shown) for managing the mobility of the UE 10 allowing to access network services anywhere, as well as to continue their ongoing communication and to access network services anywhere. It is further involved in the bearer activation/deactivation process and is also e.g. responsible for choosing the S-GW for the UE.

The P-GW 15a terminates the mobile network by means of the so-called the SGi interface towards a packet data network—PDN—20 and is thus responsible for an interworking between a mobile packet data network and the PDN.

The core network further comprises a policy server 16 that might interact both with the GPRS core network 12b and the EPS 12a. The policy server by way of example comprises a so-called Policy and Charging Rules Function (PCRF) according to 3GPP. The PCRF is a function determining policy rules in a multimedia network in real-time. Amongst other functions, the PCRF is able to access data bases, e.g. subscriber databases and specialized functions, such as charging. Within the scope of embodiments of the invention, the policy server provides mobile CDN policy information supporting an appropriate CDN CN selection e.g. to be used in a PDN CN 20.

The Packet Data Network 20 comprises a so-called content delivery network or content delivery network CDN as discussed above. The service nodes 21a-21h, in the following also being referred to as edge or cache nodes, edge or cache servers, or (local) CDN distribution nodes or CDN DNs 21a-21h might have stored copies of the same data.

The plurality of CDN distribution nodes 21a-21h may be distributed at a plurality of different geographical locations and may be physically associated to different parts of the network. FIG. 1 shows an exemplary distribution of an exemplary number of CDN distribution nodes. e.g. CDN distribution nodes 21g-21f being part of/associated to the radio access networks part, CDN distribution nodes 21b-21e being part of/associated to the core network part and CDN distribution node 21a being part of/associated to the PDN 20. Nevertheless, the CDN distribution nodes may be regarded as logically belonging to the PDN 20, being controlled by CDN server 22.

The CDN server or CDN CN (control node) 22 comprises e.g. global load balancing functionality for balancing the CDN resources (e.g. balances the load with respect to the different CDN CNs) by selecting CDN CN or supporting a CDN CN selection with respect to a request from the UE.

Further, an ALTO client 23 (by way of example collocated with the and an ALTO server 24 and an ALTO server 25 at shown.

The ALTO client 23 is a function being able to send information requests with respect to mobile UE information and/or mobile UE subscription information and/or mobile CDN policy information to an ALTO server 24 and to get corresponding information responses from the ALTO server 24, such that the associated CDN server 23 is able to perform an optimum CDN DN selection.

According to the above-cited internet draft, the ALTO service provides network information (e.g., basic network location structure, preferences of network paths) to support an efficient network resource consumption while maintaining or improving application performance. The basic information of ALTO may be based on abstract maps of a network. According to the invention, the ALTO server is enhanced by additionally collecting and providing information with respect to the mobile UE and/or mobile UE subscription information and/or mobile CDN policy information mobile The ALTO server 24 in that way can be regarded as an information hub that collects the information by contacting appropriate instances, e.g. a UDC, not shown in FIG. 1, the PCRF 16 and an OAM 23 not shown in FIG. 1.

The functions of the ALTO server might be integrated into a HTTP server. With the assistance information from the ALTO server functions, the HTTP server can redirect an HTTP request from a user to a certain CDN node. Alternatively, a domain name server—DNS—function of the CDN system (not shown in FIG. 1) is equipped with ALTO server functions. Such DNS function may steer the service request from UEs to a reasonable CDN/Cache server. Despite the existing ALTO based solution is effective to improve CDN system performance, none of mobile UEs and mobile network specific characteristics and requirements.

The user equipment (UE) 10 is a radio terminal being capable of connecting to at least one of the above described radio access networks 11a-11c and further being capable of data processing and of requesting a data content/service.

Figure 2A:
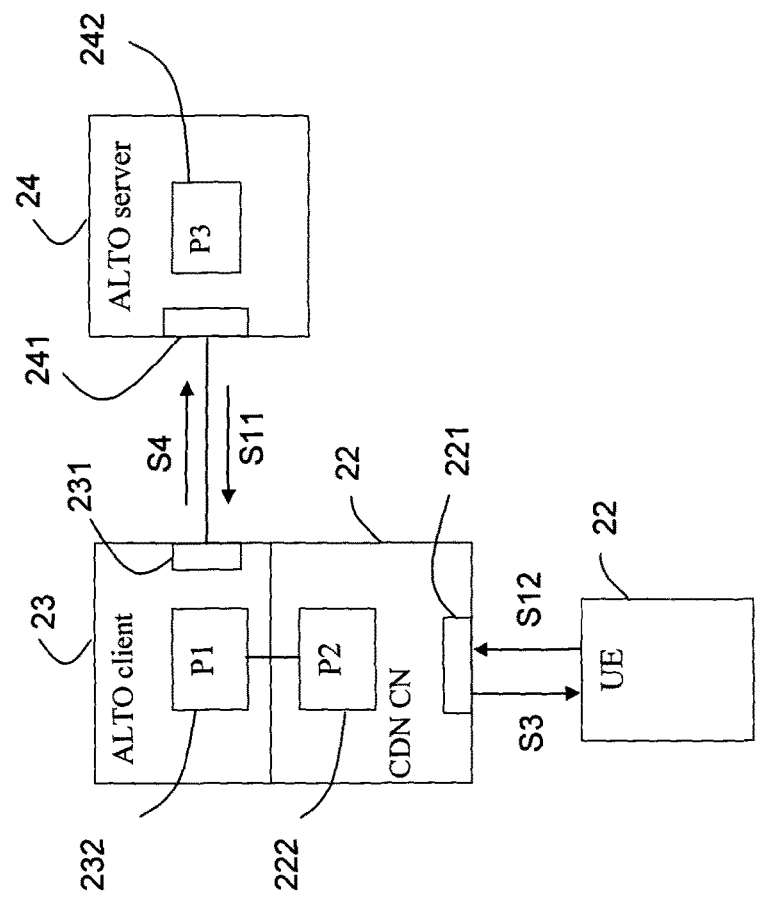
FIG. 2a shows a section of the communications network of FIG. 1 comprising a CDN server and an application server.

FIG. 2a generally shows a simple and principle block diagram depicting an ALTO client 23, being exemplarily realized as an implementation of ALTO client functions into a CDN CN 22 and an ALTO server 24. The ALTO client comprises a first processor 231 and a first interface 232. The CDN CN comprises a second processor 221 and a second interface 222. The ALTO server comprises a third processor 241 and a third interface 242. Both the first interface and the third interface are coupled such that the first processor and the third processor can communicate by means of client server messages S4 and S11 being explained in more details under FIG. 3 and FIG. 4. The third processor 241 is adapted to generate a message comprising mobility information of the UE 10 from one or a plurality of messages received from one or a plurality of network nodes as also being explained in more details under FIG. 3 and FIG. 4. The CDN CN is adapted to perform a selection of a service node out of a plurality of (possible) service nodes and to provide the UE 10 with the selection information in response to a service request received from the UE.

Figure 2B:
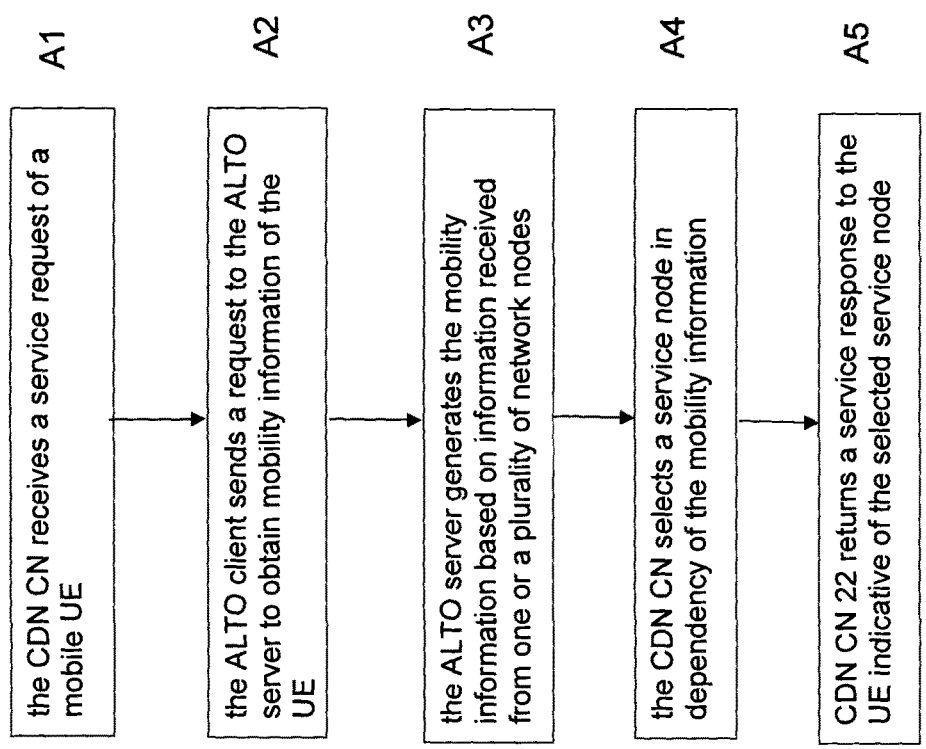
FIG. 2b shows principle method steps performed in the CDN server while interacting with the application server.

FIG. 2b shows principle method steps performed in a control server comprising the CDN CN 22 and the ALTO client 23 and the ALTO server 24:

In a first step 1A, the CDN CN receives a service request from the UE 10,

In a second step 2A, the ALTO client 23 of the control server contacts an application server 24 comprising sending a request to obtain mobility information of the UE 10, In a third step 3A, the ALTO server 24 contacts one or a plurality of network nodes to receive information indicative e.g. of a selection policy, UE capabilities, network capabilities and status, In a fourth step 4A, the CDN CN 22 selects or initiates selecting a service node from in dependency of the mobility information, and in a fifth step 5A, the CDN CN 22 returns a service response to the UE indicative of the selected service node.

In the following FIG. 3 and FIG. 4, the functions and interactions of the afore-described nodes will be explained in more detail by means of exemplary sequence diagrams.

Figure 3:
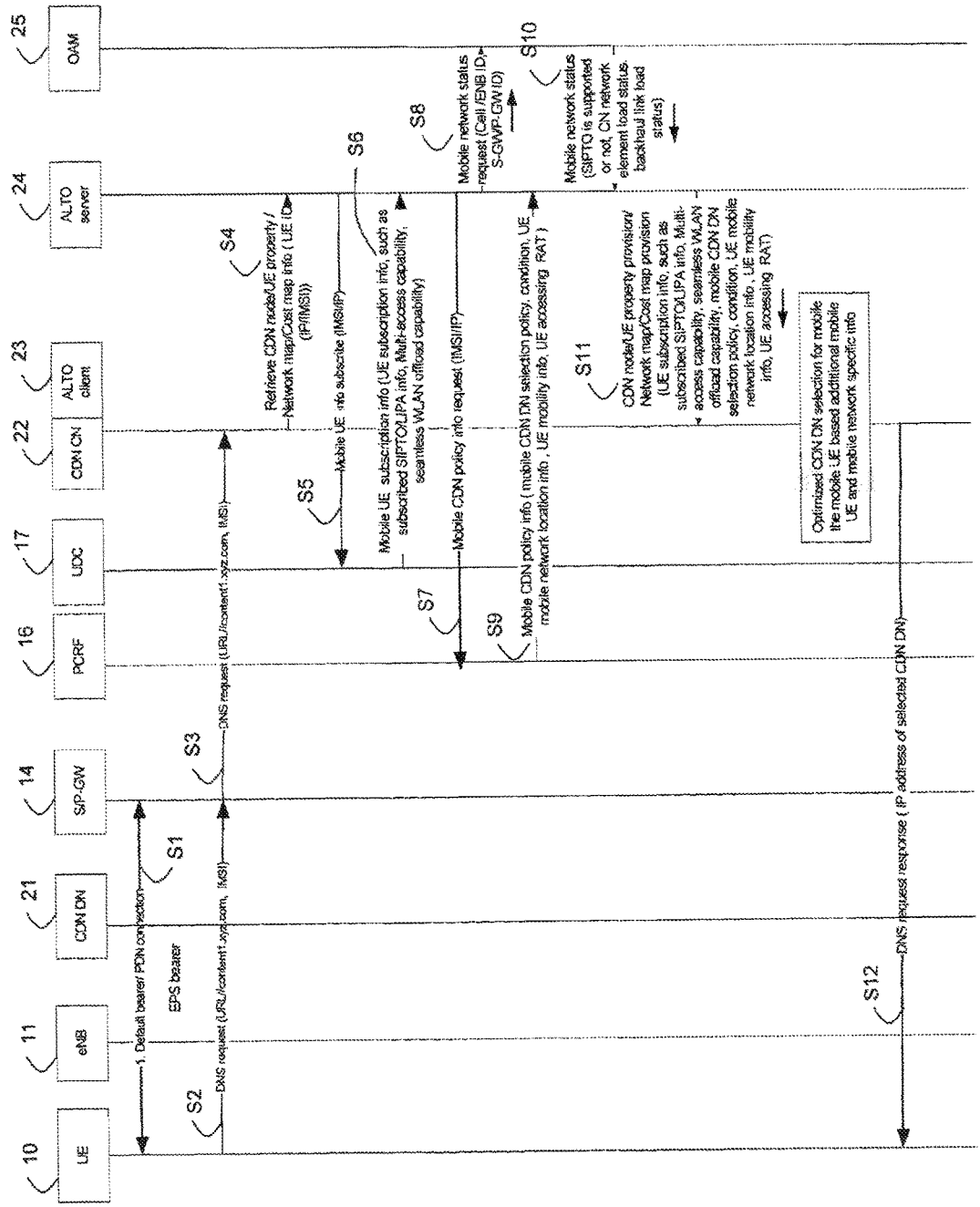
FIG. 3 shows a first exemplary sequence diagram for a CDN node selection.

Not being shown in FIG. 1, and by way of example, the described sequences involve a user data convergence node UDC 17 and an OAM system 25 (only FIG. 3). Further, by way of example the P-GW 14a and the S-GW 15a are shown as a combined gateway node 14. Further, one of the CDN distribution nodes 21a-21h is shown as an exemplary selected service node 21.

FIG. 3 shows an exemplary sequence diagram with messages S1-S12 exchanged within the communications network illustrating an edge node selection with assistance of a mobile network:

Upon an establishment of a default bearer (PDN Connection) S1 between the UE 10 and the gateway node (S/P-GW) 14, the UE 10 initiates a DNS request message S2 to get the IP address of an appropriate CDN DN or service node 21.

As an option, the UE may enrich the DNS message additionally with additional mobile network specific ID (IMSI or MSISDN) information in order to assist the CDN system to find related subscription information with respect to the UE. Alternatively, the enrichment could be completed by a network element (such as a P-GW) in case the UE couldn't support the additional function.

Upon reception of the request message S2, the gateway 15 forwards the request message S3 to the CDN CN 22. The CDN CN consults the collocated ALTO client 23 for additional mobile network and mobile UE specific information to accomplish intelligent CDN DN selection.

The ALTO Client 23 sends an ALTO client request S4 to the ALTO server 24 to get mobile UE information and/or mobile CDN service node information and/or network map information and/or cost map information based on a network location identifier representing the UE (e.g. a provider-defined network location identifier called a PID) and a network location identifier (PID) representing a candidate CDN service node by sending a HTTP message. The message may include mobile UE ID information, such IMSI/MSISDN/IP address.

The ALTO server 24 in the following contacts the PCRF serving the UE, the UDC 17 and the OAM 25 to get CDN policy information, UE subscription information and mobile network status information respectively. Sequence of such contacts is arbitrarily chosen in the following description:

The ALTO server 24 contacts the PCRF 16 by sending a PCRF request S5 to get mobile network operator's policy information with regard to corresponding mobile UEs. The mobile UEs' ID may be included in the request message S5.

The PCRF 16 provides mobile CDN policy information such as mobile CDN DN selection policy, UE mobile network location information and UE mobility information UE accessing RAT information (e.g. information about the actual RAT used by the UE, e.g. GERAN, UTRAN or EUTRAN) by sending a PCRF response message S9 to the ALTO server 24.

The ALTO server 24 further might contact the UDC 17 by sending a UDC request S5 to get UE subscription information.

The UDC 17 provides subscription information related to the requested UE 10 to the ALTO server 24 by sending a UDC response message S6. The subscription may include: UE SIPTO/LIPA subscription, QoS subscription information, and UE capability information if available.

Based on location information of related mobile UE (e.g. being retrieved from the PCRF or the P-GW), the ALTO server 24 may further contact the OAM system 25 by sending a OAM request message S8 to the OAM system 25 requesting related mobile network load information associated to the mobile UE. The ALTO server 24 may indicate which specific network element is in question e.g. by providing a corresponding network element ID, such as, BS ID, P-GW ID.

As response to the OAM request message S8, the OAM system 25 provides the required CDN network topology information and/or network load information of related network elements, such as CN load and backhaul link load status information, radio interface load info and RAN element load info by sending an OAM response message S10 to the ALTO server 24.

Upon reception of the requested information, the ALTO server 23 replies to the ALTO client with an ALTO response message S11 (HTTP response message) to provide the requested information as discussed above, such as the endpoint property information about the mobile UE and/or mobile CDN service/edge node, and/or network map information and/or cost map information between the PID representing the mobile UE and PIDs representing candidate CDN service/edge nodes (CDN DN), or ranked CDN DN list based on endpoint cost of each candidate CDN DN. The additional mobile network information can be included as part of endpoint property or network map or cost map information used by ALTO client 22 for CDN DN selection. The additional information may include all information collected from related mobile network element as mentioned before.

The ALTO client 23 provides the related information acquired from the ALTO server 24 and conveyed by the ALTO response message S11 to the collocated CDN control node 22. With the additional information about related CDN DN and/or mobile UE, the CDN CN 22 selects a CDN DN 21 from all available CDN service nodes (e.g. provided by a list). For example: for a low speed moving UE, a CDN service node closer to the UE 10 is selected, e.g. an edge node located in the RAN. For a high speed moving UE, a service node closer to the Gi/SGi is selected, e.g. an edge node located in the core network or above Gi/SGi.

Finally, the CDN DN 22 provides the IP address of the selected CDN DN 21 to the mobile UE 10 by sending back a DNS response message S12.

Figure 4:
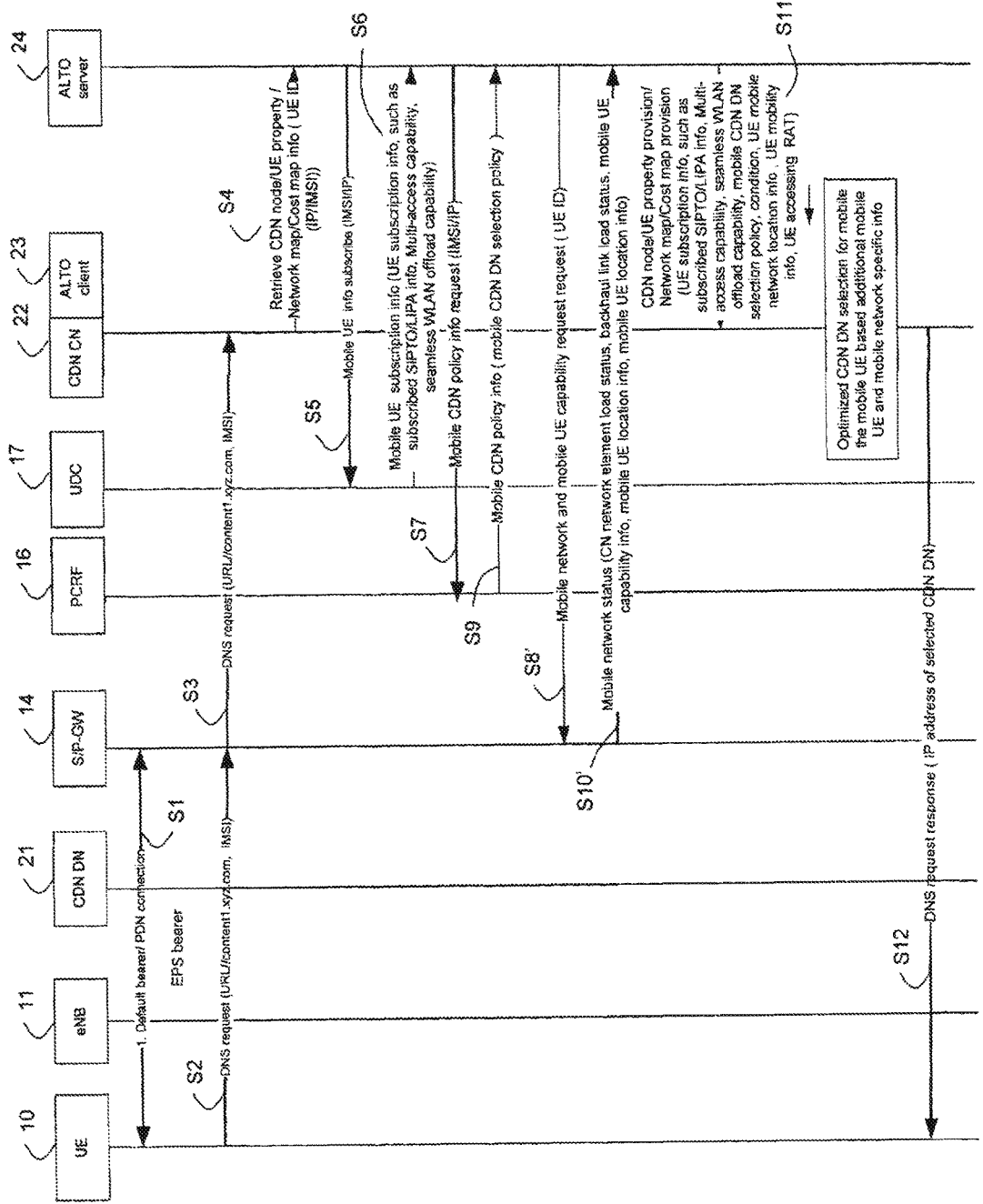
FIG. 4 shows a second exemplary sequence diagram for a CDN node selection.

FIG. 4 shows an exemplary sequence diagram for a service/edge node selection involving a P-GW 14 instead of OAM 25.

The method illustrated by FIG. 4 is essentially similar to the method illustrated by FIG. 3. Consequently messages S1-S12 are similar except messages S8 and S10 exchanged between the ALTO server 24 and the OAM 25 that are replaced by messages S8' and S10' exchanged between the alto server 24 and the P-GW or gateway node 14. As mentioned before, the UDC may not keep all required capability info about a UE, while the RAN or the CN has such info. Further, the P-GW also knows some mobile UE related info, such as location info, mobility info. Therefore in certain circumstances, contacting the P-GW instead of the OAM might be preferred.

In the following, the differences to FIG. 3 are described:

With GW request S8', the ALTO server 24 contacts the P-GW (gateway node 14) of related mobile networks to get related mobile UE specific info. Related mobile UE ID may be included in the request message With GW response S10' the P-GW in response provides UE specific dynamic information to the ALTO server, which may include UE information (e.g. UE mobility information like HO record, or moving speed (e.g. derived from HO record), Current UE location information in a mobile network, cell /eNB ID, S/P-GW, RAT being used by the UE); terminal type or capability information (seamless Wi-Fi HO, multi-access capability), CN network element information, e.g. load status info (S/P-GW load info), Radio interface and RAN load status info, backhaul link load status info related to the UE.

By way of example, information to be used for a service node selection is a speed information of the UE (actual estimated speed or an estimated averaged speed over a certain time period) e.g. being provided by the P-GW as described above (the original information about UE HO history info might come from the RAN; the speed might be derived at the base stations and conveyed to the P-GW, e.g. actively or in response to a request).

For a low speed moving UE (e.g. a UE moving with a speed below a certain speed threshold or with a HO record showing a number of cell handovers below a certain threshold), a service node close to UE 10 is selected, e.g. an edge node located in RAN.

For a high speed moving UE (e.g. a UE moving with a speed above the certain speed threshold or with a HO record showing a number of cell handovers above the certain threshold), a service node closer to Gi/SGi, e.g. a CDN service node located in the core network (CN) or above Gi/SGi is selected.

In an embodiment, it might be desired to avoid file download disruptions caused by cell handovers. In this case, at least for a high speed moving UE, a CDN service node located in the core network (CN) or above Gi/SGi is selected.

As discussed above it may be proposed to enhance the ALTO protocol as established by the IETF Internet-Draft cited above to allow conveying selection assistance information comprising at least one of the UE information, the mobile network information, and the mobile operator's policy information regarding CDN service node selection from the ALTO server to the ALTO client.

As an alternative to convey assistance to the ALTO client, the ALTO server may perform a ranking of available nodes based on the collected assistance information (e.g. in a case that the ALTO server has appropriate CDN topology information), and send corresponding ranking information to the ALTO client. In order to allow performing a selection of one node of a plurality of candidate CDN distribution nodes (e.g. all nodes or a part of the nodes that are able to serve the UE request) at the CDN control node, a prioritization of the candidate CDN distribution nodes may be performed in such a way that each a rank information is attached to the nodes e.g. by establishing a rank list. The ranking might be performed by the ALTO server in response to a request received from the ALTO client.

The selection assistance information and/or a rank list of candidate nodes can be used by the CDN control system for CDN node selection for a specific UE.

The invention claimed is:

1. A method of providing a service associated with a service request received from a mobile user equipment (UE) in a communications network; the communications network comprising a plurality of service nodes, a service control node, and an application server; the method comprising:
   receiving, at the service control node, from the mobile UE, a request for a service, wherein the service control node is in a core network of the communications network, or is in a network reachable from the UE via the core network;
   sending, by the service control node, in response to the service request, a request to the application server to get selection assistance information with respect to the UE;
   receiving, at the service control node, a response from the application server comprising selection assistance information; and
   selecting, or initiating selection of, by the service control node, a service node from the plurality of service nodes based on the selection assistance information, wherein the service node provides the requested service at an application layer; wherein the selection assistance information comprises at least one of:

information indicative of a mobility of the UE, the information indicative of the mobility of the UE comprising information indicative of a moving speed and/or a location of the UE;

UE capability information;

UE subscription information;

a selection policy of a mobile network operator with respect to the UE; and network information comprising load information of one or a plurality of nodes, or of communication links, of the communication network.

2. The method of claim 1:

wherein the plurality of service nodes comprises a first set of service nodes and a second set of service nodes; and further comprising prioritizing at least one of the first and second sets for selecting the service node based on the selection assistance information.

3. The method of claim 2:

wherein the selection assistance information comprises mobility information indicative of at least one of a location and a speed of the UE; and wherein the service node selection is performed based on at least one of the location and the speed.

4. The method of claim 3:

wherein the mobility information comprises a handover record indicative of a number of cell handovers performed in a certain period; and wherein a speed of the UE is determined from the handover record.

5. The method of claim 3, wherein, if the UE is moving with a speed below a certain threshold, a service node associated with the first set of service nodes is selected; otherwise a service node associated with the second set of service nodes is selected.

6. The method of claim 3, wherein, if an expected life time of a service session associated with the service request is below a certain time threshold, a service node associated with the first set of service nodes is selected; otherwise a service node associated with the second set of service nodes is selected.

7. The method of claim 3:

wherein the response comprises policy information regarding a service node selection; and wherein the prioritizing at least one of the first and second sets is based on the policy information.

8. The method of claim 2:

wherein the first set of service nodes is associated with a mobile network comprising a radio access domain and a core network domain of the communications network; and wherein the second set of service nodes is associated with a packed data network domain of the communications network.

9. The method of claim 8:

wherein the selection assistance information comprises network information indicative of network element load information or network link load information; and wherein, if at least one core network element or link involved into the service request is overloaded, a service node of the radio access network domain is selected or prioritized; otherwise, a service node of the core network domain is selected or prioritized.

10. The method of claim 1:

wherein a ranking of service nodes that can serve the UE request is performed prior to selecting or supporting a selection of the service node out of the plurality of service nodes; and wherein selecting a service node out of the plurality of service nodes comprises determining a node according to the ranking.

11. The method of claim 1, further comprising the service control node transmitting a service response to the UE indicative of the selected service node.

12. A method of supporting, in response to a service request of a mobile user equipment (UE), a selection of a service node out of a plurality of service nodes of a communications network, wherein the communications network comprises an application server, the method comprising:

receiving, by the application server, a request to get selection assistance information with respect to the UE, the request being from a service controller that controls the plurality of service nodes and the request being in response to a service request from the UE, wherein the service controller is in a core network of the communications network, or is in a network reachable from the UE via the core network; and sending, by the application server, a response, comprising the selection assistance information, to the service controller to support the service controller in selecting or initiating selecting a service node from the plurality of service nodes based on the selection assistance information, wherein the service node provides the service requested by the UE at an application layer;

wherein the selection assistance information comprises at least one of:

information indicative of a mobility of the UE, the information indicative of the mobility of the UE comprising information indicative of a moving speed and/or a location of the UE;

UE capability information;

UE subscription information;

a selection policy of a mobile network operator with respect to the UE; and network information comprising load information of one or a plurality of nodes, or of communication links, of the communication network.

13. The method of claim 12, further comprising the application server:

receiving network status information indicative of at least one of:

a topology of a core network;

a capability information of core network nodes; and load information of core network nodes; and using the network status information to generate the selection assistance information to be transmitted to the service controller.

14. The method of claim 12, further comprising the application server:

receiving policy information, from a policy server, indicative of a policy to select or not select one of certain service nodes out of the plurality of service nodes; and using the policy information to generate the selection assistance information to be transmitted to the service controller.

15. The method of claim 12, further comprising the application server:

receiving policy information to select or not select service nodes out of the plurality of service nodes; and using the policy information to generate the selection assistance information to be transmitted to the service controller.

16. The method of claim 12:
further comprising the application server ranking the service nodes based on at least one of:
information indicative of a UE capability and/or a UE subscription;
information indicative of a mobility of the UE;
network status information indicative of at least one of:
a topology of a core network;
capability information of core network nodes; and
load information of the core network nodes;
policy information indicative of a policy to select or not select one of certain service nodes out of the plurality of service nodes;
wherein the selection assistance information comprises a list of ranked service nodes to be used for selecting or initiating selecting a service node from the plurality of service nodes.

17. The method of claim 12, wherein the selection assistance information comprises a moving speed and/or a location of the UE.

18. A service controller operable in a communications network to provide a service associated with a service request received from a mobile user equipment (UE), the communications network comprising a plurality of service nodes, the service controller comprising:
a first communication interface configured to communicate with an application server to receive from the application server a message comprising selection assistance information with respect to the UE;
a processing circuit configured to select, or initiate selection of, a service node from the plurality of service nodes based on the selection assistance information; and
a second communication interface configured to communicate with a UE to:
receive, from the UE, the service request; and
transmit, to the UE, a service response indicative of the selected service node;
wherein the service controller is in a core network of the communications network, or is in a network reachable from the UE via the core network; and
wherein the selection assistance information comprises at least one of:
information indicative of a mobility of the UE, the information indicative of the mobility of the UE comprising information indicative of a moving speed and/or a location of the UE;
UE capability information;
UE subscription information;
a selection policy of a mobile network operator with respect to the UE; and
network information comprising load information of one or a plurality of nodes, or of communication links, of the communication network.

19. The service controller of claim 18, wherein the service node provides the requested service at an application layer.

20. An application server operable in a communications network for supporting, in response to a service request of a mobile user equipment (UE), a selection of a service node out of a plurality of service nodes of the communications network, the application server comprising:
a communication interface configured to communicate with a service control node to send a message comprising selection assistance information to support the service control node in selecting, or initiating selecting, a service node from the plurality of service nodes based on the selection assistance information, wherein the service node provides the service requested by the UE at an application layer; and
a processing circuit configured to generate the message by processing one or a plurality of messages received from one or a plurality of communications network nodes in response to receiving the service request of the UE;
wherein the service control node is in a core network of the communications network, or is in a network reachable from the UE via the core network; and
wherein the selection assistance information comprises at least one of:
information indicative of a mobility of the UE, the information indicative of the mobility of the UE comprising information indicative of a moving speed and/or a location of the UE;
UE capability information;
UE subscription information;
a selection policy of a mobile network operator with respect to the UE; and
network information comprising load information of one or a plurality of nodes, or of communication links, of the communication network.

21. A computer program product stored in a non-transitory computer readable medium for providing a service associated with a service request received from a mobile user equipment (UE) in a communications network; the communications network comprising a plurality of service nodes, a service control node, and an application server; the computer program product comprising software instructions which, when run on one or more processing circuits of the service control node, causes the service control node to:
receive, at the service control node, from the mobile UE, a request for a service, wherein the service control node is in a core network of the communications network, or is in a network reachable from the UE via the core network;
send, by the service control node, in response to the service request, a request to the application server to get selection assistance information with respect to the UE;
receive, at the service control node, a response from the application server comprising selection assistance information; and
select, or initiate selection of, by the service control node, a service node from the plurality of service nodes based on the selection assistance information, wherein the service nodes provide the requested service at an application layer;
wherein the selection assistance information comprises at least one of:
information indicative of a mobility of the UE, the information indicative of the mobility of the UE comprising information indicative of a moving speed and/or a location of the UE;
UE capability information;
UE subscription information;
a selection policy of a mobile network operator with respect to the UE; and
network information comprising load information of one or a plurality of nodes, or of communication links, of the communication network.

22. A computer program product stored in a non-transitory computer readable medium for supporting, in response to a service request of a mobile user equipment (UE), a selection of a service node out of a plurality of service nodes of a communications network, wherein the communications network comprises an application server, the computer program product comprising software instructions which, when run on one or more processing circuits of the application server, causes the application server to:
  receive, at the application server, a request to get selection assistance information with respect to the UE, the request being from a service controller that controls the plurality of service nodes and the request being in response to the service request of the UE; and
  send, by the application server, a response, comprising the selection assistance information, to the service controller to support the service controller in selecting or initiating selecting a service node from the plurality of service nodes based on the selection assistance information, wherein the service node provides the requested service at an application layer;
wherein the service controller is in a core network of the communications network, or is in a network reachable from the UE via the core network; and
wherein the selection assistance information comprises at least one of:
  information indicative of a mobility of the UE, the information indicative of the mobility of the UE comprising information indicative of a moving speed and/or a location of the UE;
  UE capability information;
  UE subscription information;
  a selection policy of a mobile network operator with respect to the UE; and
  network information comprising load information of one or a plurality of nodes, or of communication links, of the communication network.

* * * * *